(12) United States Patent
Kirkland et al.

(10) Patent No.: US 6,588,465 B1
(45) Date of Patent: Jul. 8, 2003

(54) PASSIVE VARIABLE SPEED DROGUE

(75) Inventors: William L. Kirkland, Kingman, AZ (US); Matts Lindgren, Auburn, CA (US); Jerry Stultz, Corona, CA (US)

(73) Assignee: West Coast Netting, Inc., Kingman, AZ (US)

( * ) Notice: Subject to any disclaimer, the term of this patent is extended or adjusted under 35 U.S.C. 154(b) by 0 days.

(21) Appl. No.: 10/050,682

(22) Filed: Jan. 15, 2002

(51) Int. Cl.[7] ............................................. B64D 37/00
(52) U.S. Cl. ....................... 141/279; 141/387; 244/113; 244/135 A; 137/615; 137/899.2
(58) Field of Search ............................... 141/279, 387, 141/388; 244/113, 135 A; 137/899.2, 615–616.7

(56) References Cited

U.S. PATENT DOCUMENTS

| | | |
|---|---|---|
| 2,055,620 A | 9/1936 | Boehme |
| 2,239,854 A * | 4/1941 | McCormick ................ 244/113 |
| 2,384,997 A | 9/1945 | Hansson |
| 2,559,804 A | 7/1951 | Smith |
| 2,823,881 A | 2/1958 | Patterson |
| 2,946,543 A | 7/1960 | Gordon et al. |
| 2,960,291 A | 11/1960 | Patterson |
| 2,998,949 A | 9/1961 | Patterson |
| 3,011,742 A | 12/1961 | Gross |
| 3,067,972 A | 12/1962 | Mosher |
| 3,108,769 A | 10/1963 | Hieber |
| 4,927,099 A | 5/1990 | Emerson et al. |
| 5,255,877 A | 10/1993 | Lindgren et al. |
| 5,427,333 A | 6/1995 | Kirkland |
| 5,517,938 A * | 5/1996 | Wood et al. ................. 114/311 |

FOREIGN PATENT DOCUMENTS

FR 541505 10/1955

* cited by examiner

Primary Examiner—J. Casimer Jacyna
(74) Attorney, Agent, or Firm—Fulwider Patton Lee & Utecht, LLP

(57) ABSTRACT

The aerial refueling drogue utilizes a bleeding drogue canopy providing substantially constant loads over a range of refueling speeds, by passive movement of the bleeding drogue between a retracted position and and extended position. The passive variable speed drogue comprises leading edge support arms, center support arms, and trailing edge support arms mounted to a refueling coupling member, with a forward drogue canopy attached between the leading edge support arms and the center support arms. An aft bleeding drogue canopy is connected between the center support arms and the trailing edge support arms. Springs in the trailing edge support arms bias the bleeding drogue canopy to a retracted position. In an alternate embodiment, cords are attached to the trailing edge of the aft bleeding drogue canopy, continue through the trailing edge support arms, up each center support arm, and through rings attached to the inside of the aft bleeding drogue canopy. The other ends of the cords are also attached to the trailing edge of the aft bleeding drogue canopy.

17 Claims, 8 Drawing Sheets

PASSIVE VARIABLE SPEED DROGUE

BACKGROUND OF THE INVENTION

1. Field of the Invention

This invention relates generally to aerodynamic drogues for aerial inflight refueling, and more particularly concerns an improved aerial inflight refueling drogue assembly having a spring loaded bleeding drogue that allows the bleeding drogue to extend as the speed increases and the load on the drogue increases, to maintain substantially constant loads on the drogue within a range of refueling refueling speeds.

2. Description of Related Art

The development of drogues for inflight refueling of aircraft has been primarily directed by the need to stabilize a refueling hose trailing from a tanker aircraft in a generally horizontal attitude. The drogue provides drag for the refueling coupling, which must resist the forward movement of a probe from a refueling aircraft. Cone shaped drogues have, proved to be suitable for low speed inflight refueling; however, it has been found that such drogues can become highly unstable at higher speeds, causing the refueling coupling device at the end of the refueling hose to become an oscillating, bobbing target, and occasionally causing the structure of the cone shaped drogue to collapse.

The high amount of drag provided by a drogue for low speed refueling also can cause the trail angle of the refueling hose and coupling to become flattened. It is desirable that the refueling aircraft not follow directly in the wake of the tanker aircraft, so that the configuration of a drogue which may be appropriate for low air speed refueling can be inappropriate for high speed refueling, even if the motion of the refueling coupling can be stabilized by aerodynamic designs.

It has therefore been a common practice to install either a low or high speed configuration drogue on the refueling coupling of a tanker aircraft on the ground, depending upon whether the aerial refueling is to take place at low or high speed, and to land to change the drogue to one of another speed configuration when an aircraft needs to be refueled at a different speed. Another approach has been to fabricate the ring shaped parachute canopy of the drogue of elastic material with openings which permit pressure modulation to provide for a constant amount of drag over varying speeds. However, such elastic openings have been found to be subject to deterioration, which can cause the amount of drag provided by the drogue to decrease over time, and can also cause an asymmetrical drag configuration to develop.

There is therefore a continuing need for a variable speed drogue which can maintain a substantially constant load on the drogue over a range of refueling speeds, and which is not generally susceptible to deterioration or damage from a refueling probe. It would also be desirable to provide a refueling drogue system that requires no modifications to a refueling tanker aircraft, and can be bolted on to a conventional coupling for conventional drogue frames and drogues, and that will permit refueling to be done from the lowest through the highest aircraft refueling speeds. The present invention meets these needs.

SUMMARY OF THE INVENTION

Briefly, and in general terms, the present invention provides for an aerial refueling drogue that provides stability and remains inflated throughout a range of refueling speeds. The aerial refueling drogue is a bleeding type of drogue that provides substantially constant loads over a range of refueling speeds managed through movement of the refueling drogue between a retracted position and and extended position. The aerial refueling drogue system does not require modification to a refueling tanker aircraft, and can be mounted to a conventional coupling for conventional drogue frames and drogues.

The invention accordingly provides for a passive variable speed drogue for use with an inflight aerial refueling system. The refueling system includes a fuel supply, a fuel line having leading in fluid communication with the fuel supply, and a refueling coupling member connected to the fuel line for receiving a refueling probe. In one presently preferred embodiment, the passive variable speed drogue comprises a plurality of first and second support arms mounted to the trailing edge portion of the refueling coupling means, and a bleeding drogue canopy having a leading edge, a trailing edge, and a projected area. A plurality of springs operatively connect the bleeding drogue canopy between the first and second support arms, such that the bleeding drogue canopy is movable between a retracted position in which the springs are retracted, and an extended position in which the springs are extended, the projected area of the bleeding drogue canopy being variable between a maximum projected area in the retracted position and a minimum projected area in the extended position, whereby over a range of refueling speeds the bleeding drogue extends as the speed increases and the load on the drogue increases, and retracts as the speed decreases and the load on the bleeding drogue decreases, to maintain substantially constant loads on the bleeding drogue within the range of refueling speeds.

In another presently preferred aspect of the invention, the passive variable speed drogue comprises a plurality of leading edge support arms mounted to the trailing edge portion of the refueling coupling member, a plurality of center support arms mounted to the trailing edge portion of the refueling coupling member, extending radially inwardly and rearward of the leading edge support arms, and a forward drogue canopy attached between the trailing end of the leading edge support arms and the trailing end of the center support arms. A plurality of trailing edge support arms are also mounted to the trailing edge portion of the refueling coupling member, and an aft bleeding drogue canopy is connected between the trailing end of the center support arms and the trailing end of the trailing edge support arms. A plurality of springs operatively connect the aft bleeding drogue canopy to one of the trailing end of the center support arms and the trailing end of the trailing edge support arms, such that the aft bleeding drogue canopy is movable between a retracted position in which the springs are retracted, and an extended position in which the springs are extended. The projected area of the aft bleeding drogue canopy thus can vary between a maximum projected area in the first retracted position and a minimum projected area in the second extended position, so that over a range of refueling speeds the aft bleeding drogue extends as the speed increases and the load on the aft bleeding drogue increases, and retracts as the speed decreases and the load on the aft bleeding drogue decreases, to maintain substantially constant loads on the aft bleeding drogue within the range of refueling speeds.

In an alternate embodiment, a plurality of cords are attached at their origin ends to the trailing edge of the aft bleeding drogue canopy, continue respectively through each of the trailing edge support arms, and respectively up each center support arm, and through small rings attached to the inside of the aft bleeding drogue canopy. The plurality of cords are respectively attached at their other ends to the trailing edge of the aft bleeding drogue canopy at the same place where the origins of the cords are attached. As the load increases and the springs are compressed, the aft bleeding drogue canopy is gathered together at the end of the center support arms, so that the aft bleeding drogue canopy is not allowed to extend beyond the end of the drogue, reducing the amount of drogue allowed to be loose and waving like a flag, and thereby reducing "flag drag."

These and other aspects and advantages of the invention will become apparent from the following detailed description and the accompanying drawings, which illustrate by way of example the features of the invention.

DETAILED DESCRIPTION OF THE PREFERRED EMBODIMENTS

Inflight refueling drogues are important for use during aerial refueling operations in order to avoid oscillation and instability, and to provide the proper trail angle for the flight speed during refueling. Landing for changing of the appropriate low or high speed configuration drogues on the ground between refueling of aircraft inflight at different speeds can be tedious and time consuming. Conventional parachute canopies with elastic openings or spring assemblies to provide for a desired amount of drag over varying speeds are subject to deterioration and damage by contact with a probe of a refueling aircraft, and can interfere with the drag configuration and stability of the drogue during the inflight refueling operation.

Figure 1:
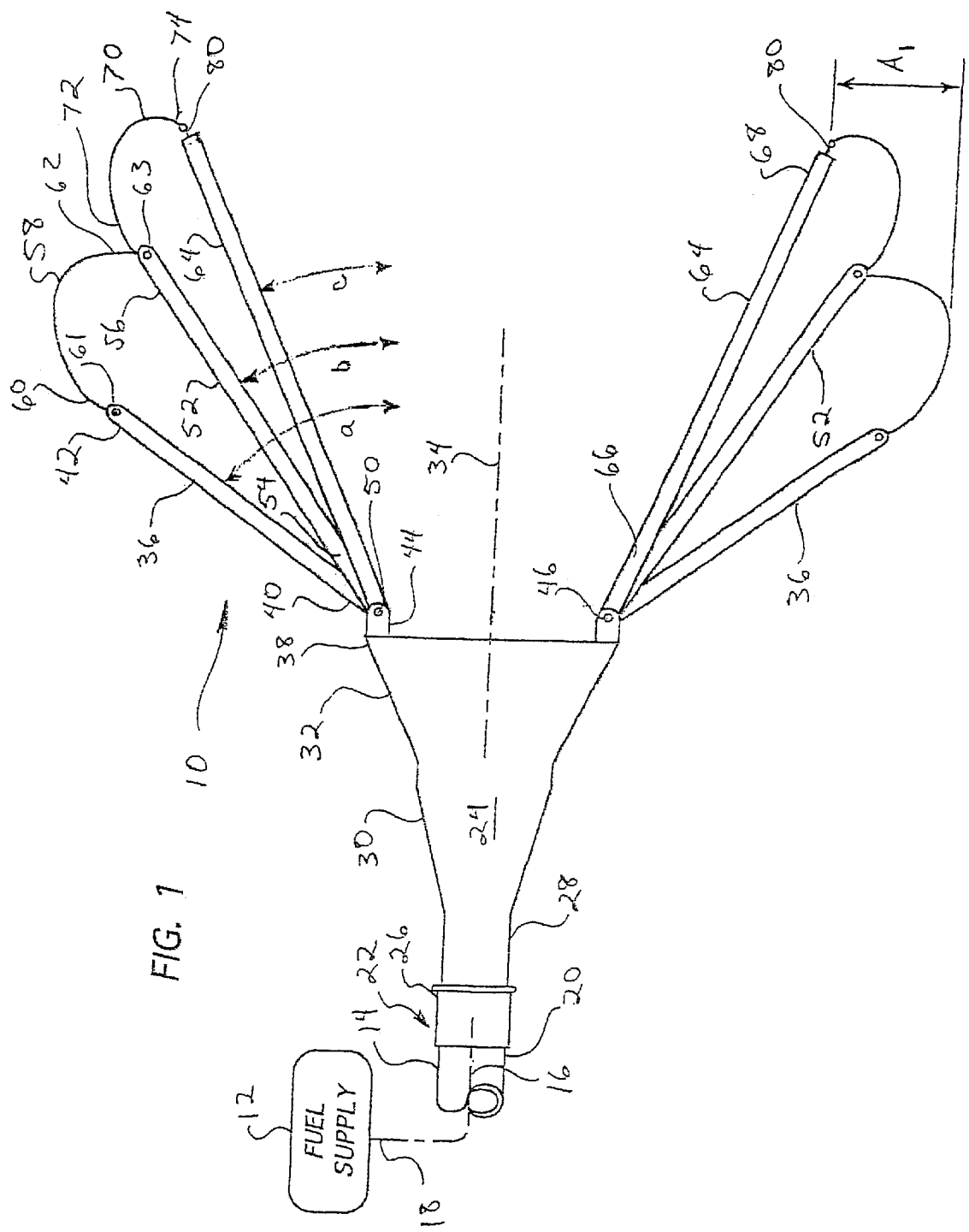
FIG. 1 is a sectional elevational view of a passive variable speed drogue for inflight refueling of aircraft according to the invention depicting a high drag, low speed configuration.

As is illustrated in the drawings, the invention is accordingly embodied in passive variable speed drogue 10 for use with an inflight aerial refueling system. With reference to FIG. 1, the inflight aerial refueling system typically includes a fuel supply 12, such as a fuel tank in a tanker aircraft, an aircraft drogue stowage tube (not shown) which can be mounted in a wing pod or fuselage of a tanker aircraft for stowing the drogue, and a fuel line 14 that can be extended and retracted during flight for refueling other aircraft, that is connected for fluid communication with the fuel supply. The fuel line has a longitudinal axis 16, a leading end 18 connected to the tanker aircraft fuel supply, and a trailing end 20 connected to the forward end 22 of a refueling coupling member 24. The refueling coupling member is generally hollow and conical in shape, having a closed forward mating end portion 26 attached to the fuel line, a tubular intermediate section 28, a tapered intermediate throat section 30 flaring outward slightly to the rear of the tubular intermediate section for friction fit connection with a refueling probe (not shown) of an aircraft that is refueling, and a funnel shaped, tapered mouth portion 32 flaring outwardly at the rearward end of the refueling coupling member for receiving the refueling probe. The longitudinal axis of the fuel line is generally in line with the longitudinal axis 34 of the refueling coupling member where they are joined together.

As is illustrated in FIGS. 1–6, a plurality of leading edge support arms 36 are mounted to the trailing edge portion 38 of the refueling coupling member, and in a presently preferred embodiment, the leading edge support arms are fixedly mounted to the refueling coupling member, extending at an angle a with respect to the longitudinal axis of the refueling coupling member. The leading edge support arms each have a leading end 40 and a trailing end 42, and in one presently preferred embodiment, there are 18 leading edge support arms arrayed around the trailing edge of the refueling coupling member. The trailing edge portion of the refueling coupling member preferably includes a plurality of flanges 44 symmetrically arrayed around the trailing edge portion of the refueling coupling member, each of the flanges having an aperture 46 for mounting of the leading edge support arms. The leading ends of the leading edge support arms include an aperture 50 for fixed mounting of the leading edge support arms, such as by bolts or welding or the like.

A plurality of center support arms 52, each having a leading end 54 and a trailing end 56, are mounted in the same manner as the leading edge support arms to the trailing edge portion of the refueling coupling member extending radially inwardly and rearward of the leading edge support arms. In a presently preferred embodiment, the center support arms are also fixedly mounted to the refueling coupling member, extending at an angle b with respect to the longitudinal axis of the refueling coupling member, and there are also preferably 18 center support arms arrayed around the trailing edge of the refueling coupling member. A forward drogue canopy 58, having a leading edge 60 and a trailing edge 62, is preferably fixedly attached between the trailing end of the leading edge support arms and the trailing end of the center support arms. The trailing ends of the leading edge support arms preferably include apertures 61 for attaching the forward drogue canopy member, such as by a cord, cable, hooks or loops, or the like. The trailing ends of the center support arms similarly preferably include apertures 63 for attaching the drogue canopy member in the same fashion. The forward drogue thus does not change shape, and is responsible for most required load for high speed refueling, as will be further explained below.

A plurality of trailing edge support arms 64, each having a leading end 66 and a trailing end 68, are also preferably mounted in the same manner as the leading edge and center support arms to the trailing edge portion of the refueling coupling member. In a presently preferred embodiment, the trailing edge support arms are also fixedly mounted to the refueling coupling member, extending at an angle c with respect to the longitudinal axis of the refueling coupling member. There are also preferably 18 trailing edge support arms arrayed around the trailing edge of the refueling coupling member. An aft bleeding drogue canopy 70, having a leading edge 72, a trailing edge 74, and a projected area $A_1$, $A_2$, extends between the center support arms and the trailing edge support arms. The aft bleeding drogue canopy is preferably attached to the aperture at the end of the center support arm such as by a cord, cable, hooks or loops, or the like.

Figure 2:
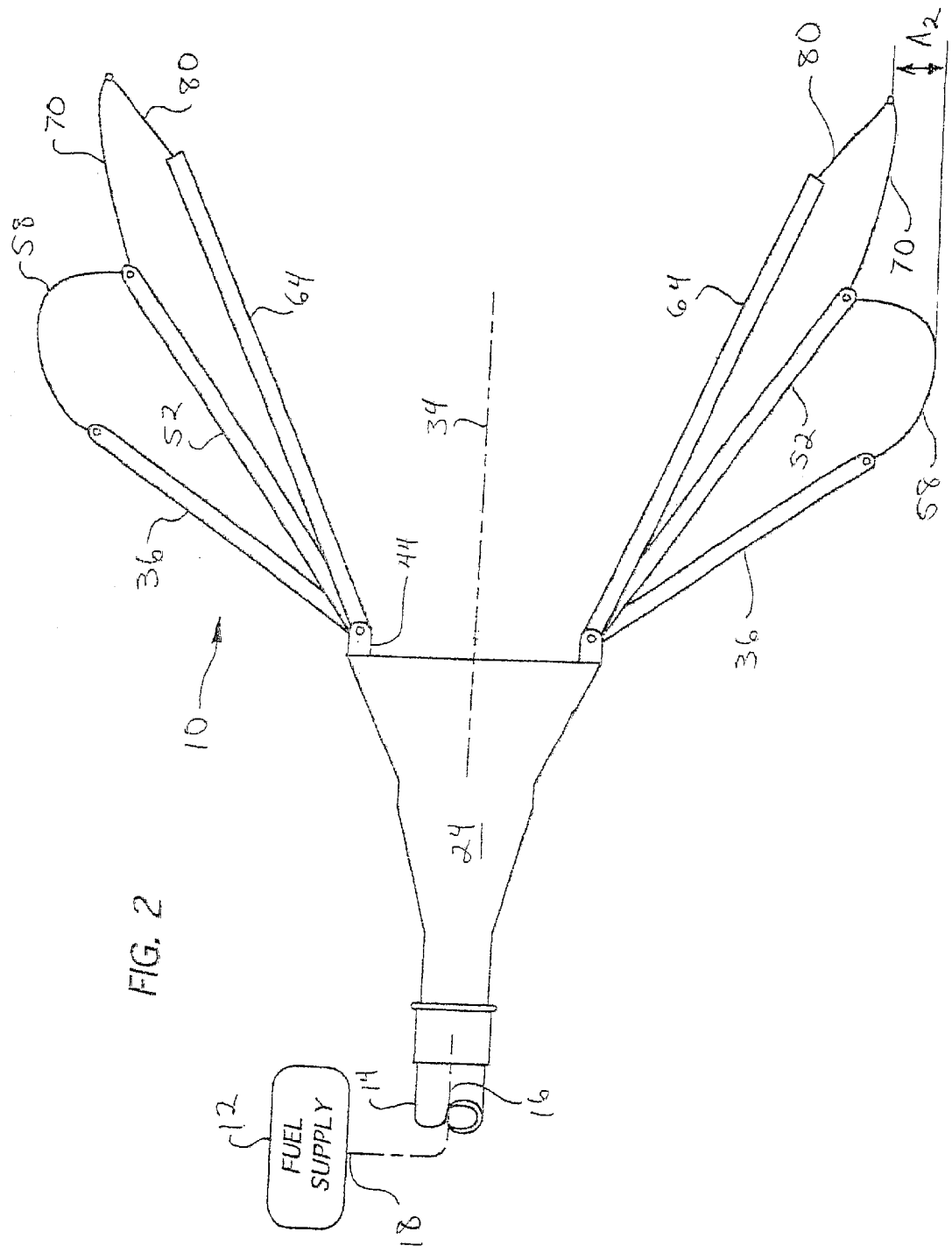
FIG. 2 is a sectional elevational view of the passive variable speed drogue of FIG. 1 depicting a low drag, high speed configuration.
Figure 3:
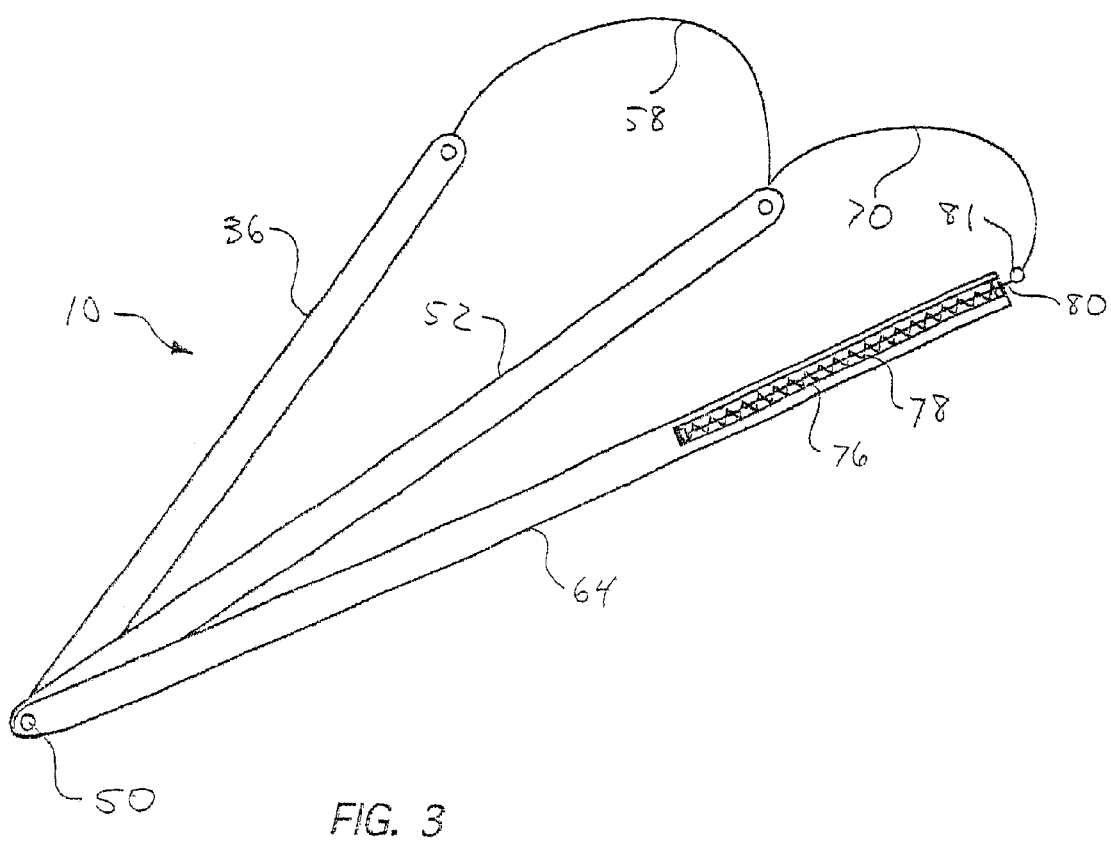
FIG. 3 is an enlarged section of FIG. 1.
Figure 4:
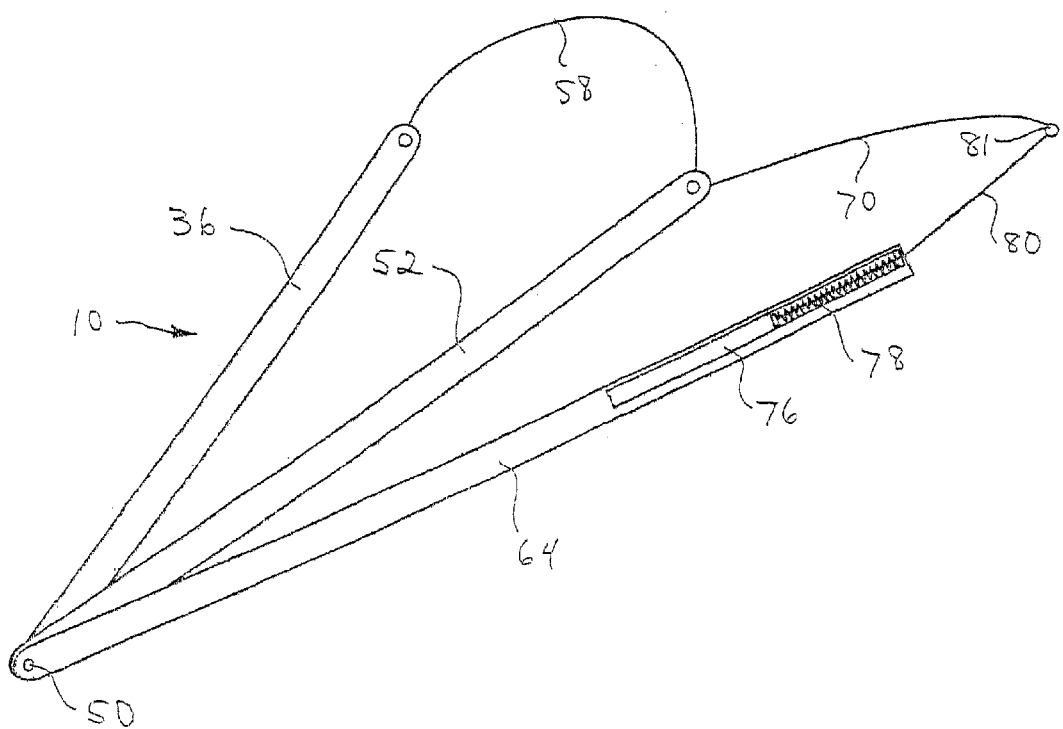
FIG. 4 is an enlarged section of FIG. 2.

With reference to FIGS. 2–4, each of the trailing edge arms includes a hollow spring chamber 76 in which a coil spring 78 is mounted, and as is best seen in FIG. 4, a cord 80 is connected between the coil spring and the aft bleeding drogue canopy. The cord is currently preferably attached to the bleeding drogue canopy by a metal ring 81, although the cord can also be suitably attached to the bleeding drogue canopy by a cord, cable, hooks or loops, or the like. The aft bleeding drogue canopy thus is movable between a first retracted position illustrated in FIGS. 1, 3 and 5, in which the springs are retracted, and a second extended position illustrated in FIGS. 2, 4 and 6, in which the springs are extended. The projected area of the aft bleeding drogue canopy thus varies between a maximum projected area $A_1$ (shown in FIG. 1) and a minimum projected area $A_2$ in the second extended position (shown in FIG. 2). In this manner, over a range of refueling speeds, the aft bleeding drogue extends as the speed increases and the load on the aft bleeding drogue increases, and retracts as the speed decreases and the load on the aft bleeding drogue decreases, to maintain substantially constant loads on the aft bleeding drogue within the range of refueling speeds. Alternatively, it should be appreciated that the coil springs could be mounted in the center support arms (not shown), connecting the aft bleeding drogue canopy between the trailing end of the center, support arms and the trailing end of the trailing edge support arms.

It should also be appreciated that the leading edge, center, and trailing edge support arms can also be pivotally mounted to the trailing edge portion of the refueling coupling member, such as by an attachment ring, for example, and be limited in their outward extension by extension limiting means such as cables connecting adjacent trailing edge support arms to each other at intermediate points along the length the trailing edge support arms.

Figure 5:
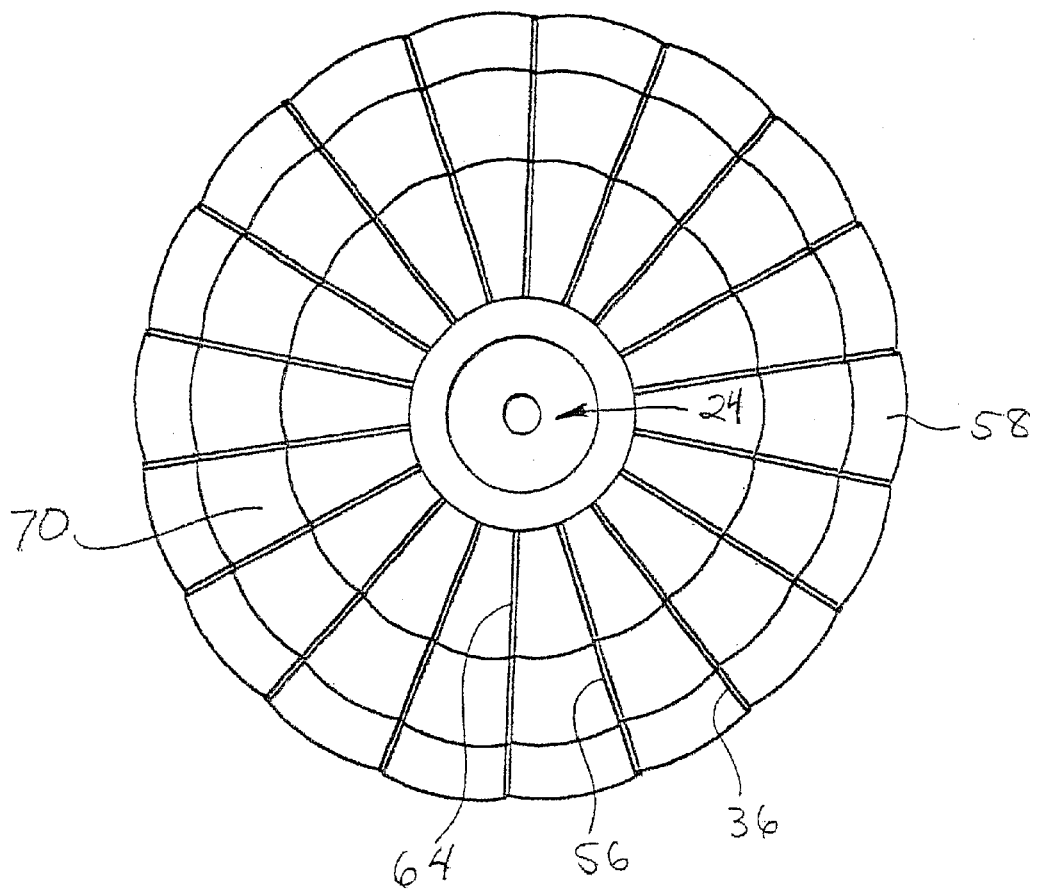
FIG. 5 is an aft view of the passive variable speed drogue in the high drag, low speed configuration shown in FIG. 1.
Figure 6:
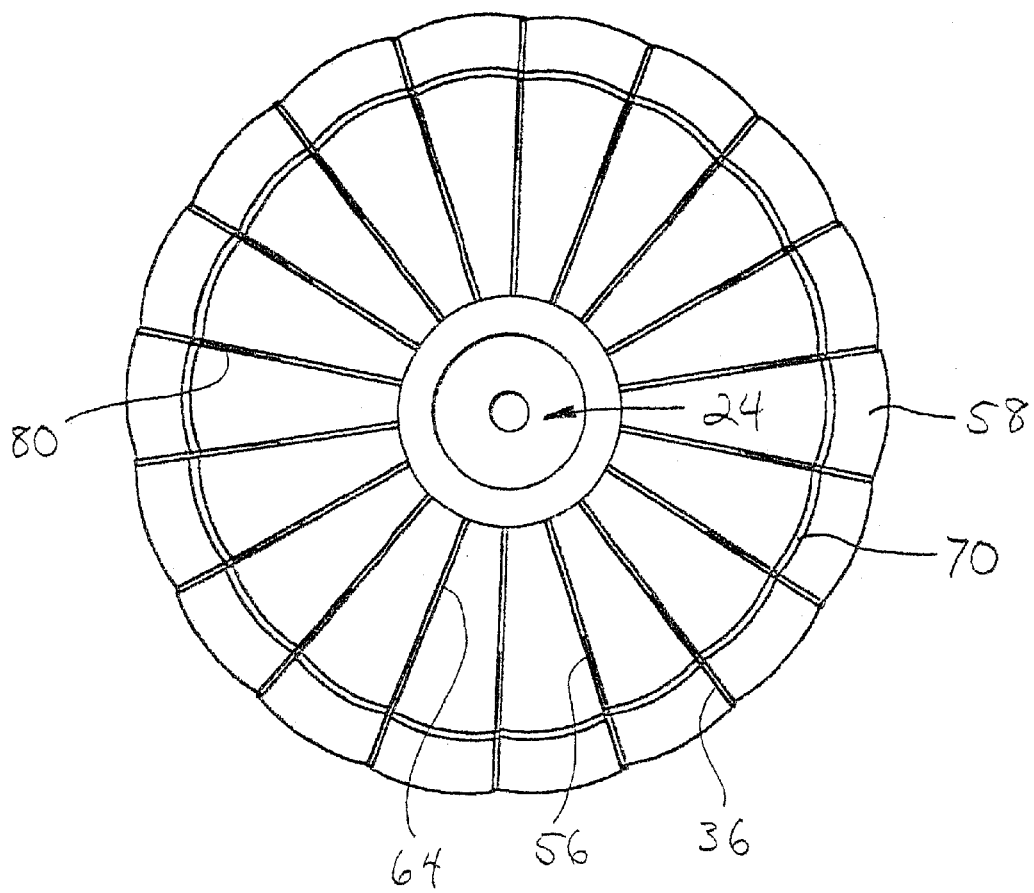
FIG. 6 is an aft view of the passive variable speed drogue in the low drag, high speed configuration shown in FIG. 2.

As is best seen in FIGS. 5 and 6, the forward drogue canopy member preferably comprises a ring shaped parachute canopy of the drogue, having a fixed projected area, and the aft bleeding drogue preferably comprises a ring shaped parachute canopy of the drogue, having a variable projected area depending upon the refueling speed and the load on the aft bleeding drogue, to maintain substantially constant loads on the aft bleeding drogue within the range of refueling speeds. Typically, a drag force of approximately 1000 lbs. or less is desired at refueling speeds ranging from a low speed of 60 knots to a high speed of 300 knots or higher. The parachute forward and aft bleeding drogue canopies may for example be made from fabric, netting, webbing, or the like, and may be made of nylon, or similar materials that are well known in the art.

Figure 7:
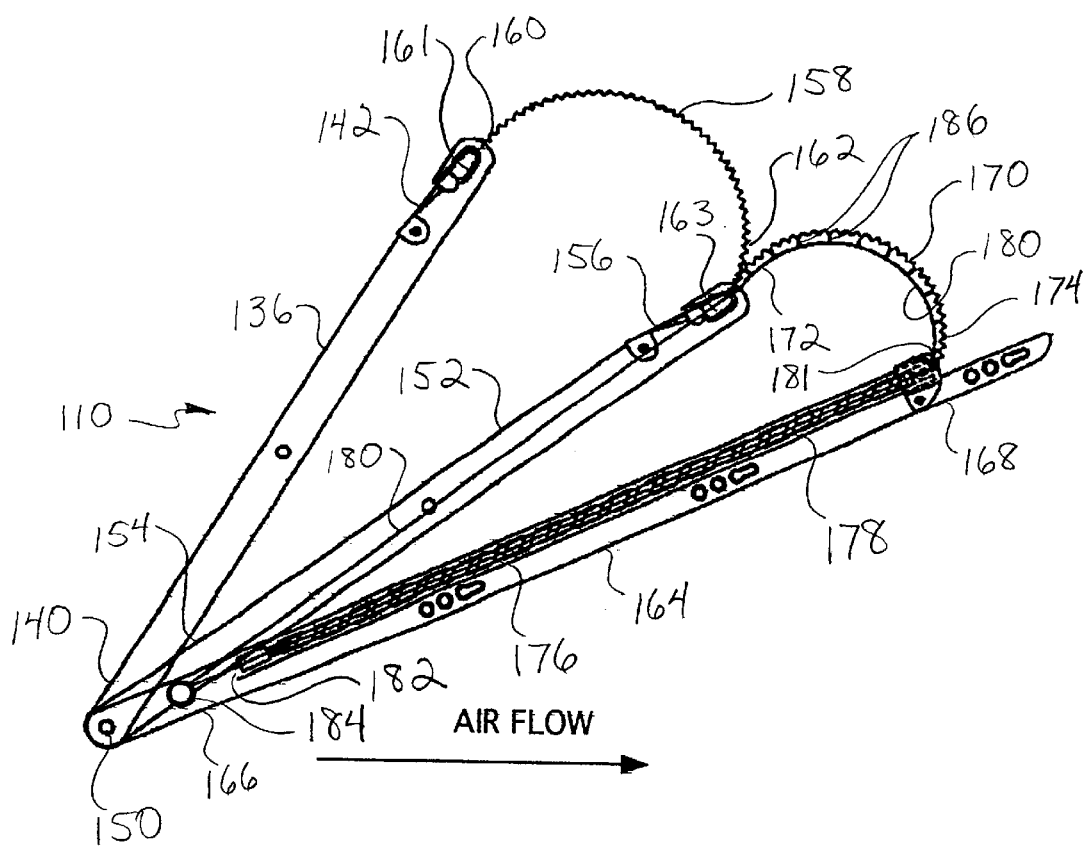
FIG. 7 is an enlarged sectional view of an alternate embodiment of the passive variable speed drogue depicting a high drag, low speed configuration.
Figure 8:
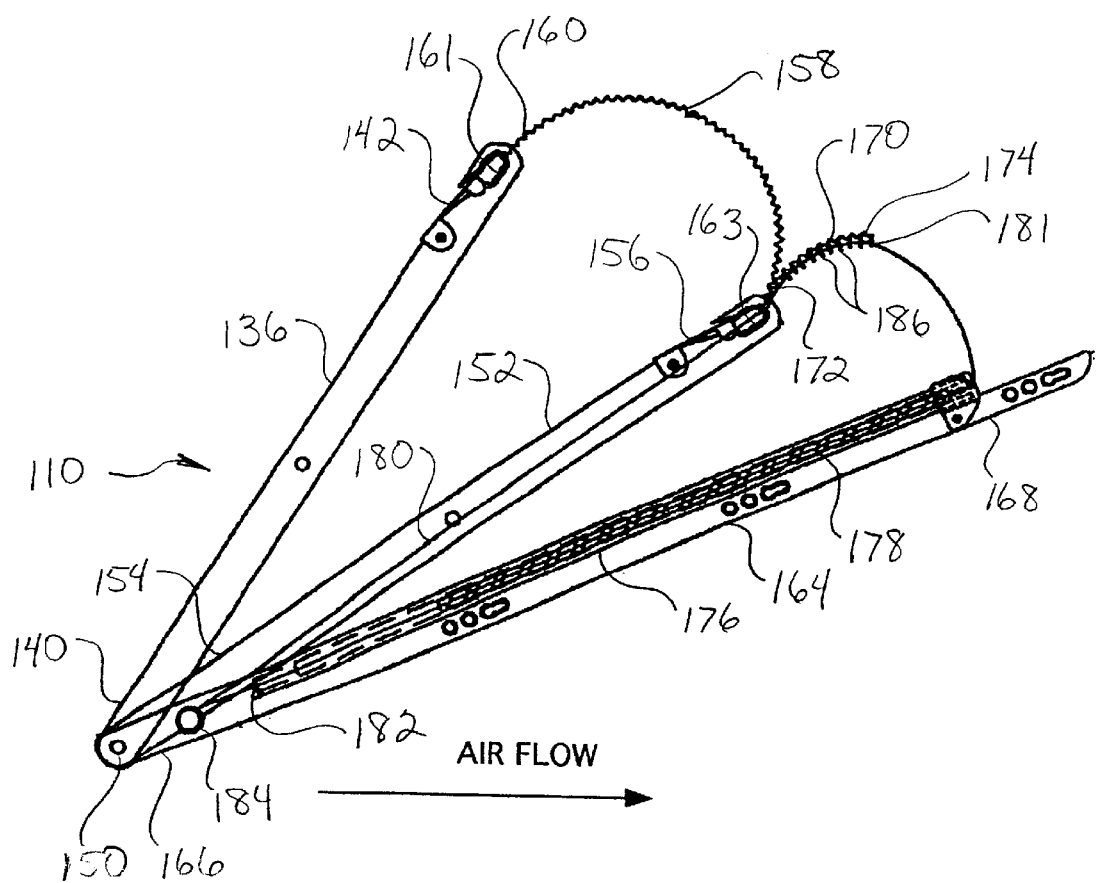
FIG. 8 is an enlarged sectional view of the embodiment of FIG. 7 showing a low drag, high speed configuration.

A presently preferred alternate embodiment of the passive variable speed drogue 110 for use with an inflight aerial refueling system is illustrated in FIGS. 7–8, in which like reference numerals refer to like elements of the foregoing embodiment. As in the foregoing embodiment, a plurality of leading edge support arms 136 are mounted to the trailing edge portion of the refueling coupling member, and in a presently preferred embodiment, the leading edge support arms are fixedly mounted to the refueling coupling member. The leading edge support arms each have a leading end 140 and a trailing end 142, and in one presently preferred embodiment, there are 18 leading edge support arms arrayed around the trailing edge of the refueling coupling member. As before, the trailing edge portion of the refueling coupling member preferably includes a plurality of flanges symmetrically arrayed around the trailing edge portion of the refueling coupling member, each of the flanges having an aperture for mounting of the leading edge support arms. The leading ends of the leading edge support arms include an aperture 150 for fixed mounting of the leading edge support arms, such as by bolts or welding or the like.

A plurality of center support arms 152, each having a leading end 154 and a trailing end 156, are mounted in the same manner as the leading edge support arms to the trailing edge portion of the refueling coupling member extending radially inwardly and rearward of the leading edge support arms. There are also preferably 18 center support arms arrayed around the trailing edge of the refueling coupling member. A forward drogue canopy 158, having a leading edge 160 and a trailing edge 162, is preferably fixedly attached between the trailing end of the leading edge support arms and the trailing end of the center support arms. The trailing ends of the leading edge support arms preferably include apertures 161 for attaching the forward drogue canopy member, such as by a cord, cable, hooks or loops, or the like. The trailing ends of the center support arms similarly preferably include apertures 163 for attaching the drogue canopy member in the same fashion.

A plurality of trailing edge support arms 164, each having a leading end 166 and a trailing end 168, are also preferably mounted in the same manner as the leading edge and center support arms to the trailing edge portion of the refueling coupling member. There are also preferably 18 trailing edge support arms arrayed around the trailing edge of the refueling coupling member. An aft bleeding drogue canopy 170, having a leading edge 172, and a trailing edge 174, is preferably attached to the aperture at the end of the center support arm such as by a cord, cable, hooks or loops, or the like.

Each of the trailing edge arms includes a hollow spring chamber 176 in which a coil spring 178 is mounted, and a plurality of cords 180 are connected respectively between the coil springs and the aft bleeding drogue canopy. The cords are currently preferably attached at their origins 179 to the trailing edge of the bleeding drogue canopy at 181, and the cords can be suitably attached to the bleeding drogue canopy by a ring, cord, cable, hooks or loops, or the like. The plurality of cords continue respectively beyond the springs through each of the trailing edge support arms, through holes 182 at the bases of the trailing edge support arms, around covered pulleys 184 mounted at the bases of the trailing edge support arms, up each of the center support arms, and through small rings 186 attached to the inside of the aft bleeding drogue canopy. The plurality of cords are respectively attached at their other ends 188 to the trailing edge of the aft bleeding drogue canopy at the same location 181 where the origins of the cords are attached. The aft bleeding drogue canopy thus is movable between a first retracted position illustrated in FIG. 7, in which the springs are retracted, and a second extended position illustrated in FIG. 8, in which the springs are compressed, and extended. Over a range of refueling speeds, the aft bleeding drogue extends as the speed increases and the load on the aft bleeding drogue increases, and retracts as the speed decreases and the load on the aft bleeding drogue decreases, to maintain substantially constant loads on the aft bleeding drogue within the range of refueling speeds. In addition, as the load increases and the springs are compressed, the aft bleeding drogue canopy is gathered together at the end of the center support arms, so that the aft bleeding drogue canopy is not allowed to extend beyond the end of the drogue. The amount of drogue allowed to be loose and waving like a flag is reduced, if not eliminated, thereby reducing "flag drag." It should also be appreciated that the coil springs could be mounted in the center support arms (not shown), connecting the aft bleeding drogue canopy between the trailing end of the center support arms and the trailing end of the trailing edge support arms.

It should be evident from the foregoing that the passive variable speed drogue of the invention provides substantially constant loads over a range of refueling speeds by spring loading of the aft bleeding drogue for movement between a retracted position and an extended position. It is further significant that the variable speed refueling drogue is not generally susceptible to deterioration or damage from a refueling probe.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A passive variable speed drogue for use with an inflight aerial refueling system, said system including a fuel supply; a fuel line having leading and trailing ends and being in fluid communication with said fuel supply; and a refueling coupling member for receiving a refueling probe, said refueling coupling member having a longitudinal axis, a forward end and a rearward end, and a trailing edge portion at said rearward end, said refueling coupling member forward end being mounted to said trailing end of said fuel line; said passive variable speed drogue comprising:

a plurality of first and second support arms adapted to be mounted to trailing edge portion of refueling coupling member, said plurality of first and second support arms each having a leading end and a trailing end;

a bleeding drogue canopy having a leading edge, a trailing edge, and a projected area, said leading edge of said bleeding drogue canopy being connected to said trailing ends of said first support arms, and said trailing edge of said bleeding drogue canopy being connected by retractable cords to said trailing ends of said second support arms, respectively, said bleeding drogue canopy being movable between a retracted position and an extended position, said projected area of said bleeding drogue canopy being variable between a maximum projected area in said retracted position and a minimum projected area in said extended position; and means connected to said retractable cords for biasing said bleeding drogue canopy to said retracted position, whereby over a range of refueling speeds said bleeding drogue extends as the speed increases and the load on the drogue increases, and retracts as the speed decreases and the load on the bleeding drogue decreases, to maintain substantially constant loads on the bleeding drogue within the range of refueling speeds.

2. The passive variable speed drogue of claim 1, wherein said means for biasing comprises a plurality of springs.

3. The passive variable speed drogue of claim 2, wherein said plurality of springs comprises a coil springs disposed in said second support arms.

4. The passive variable speed drogue of claim 1, wherein said cords have an origin end and an opposing end, and said cords are each attached at their origin end to the trailing edge of the aft bleeding drogue canopy, continue respectively through each of the second support arms, along each first support arm, through small rings attached to the inside of the aft bleeding drogue canopy, and are respectively attached at their opposing ends to the trailing edge of the aft bleeding drogue canopy where the origins of the cords are attached.

5. The passive variable speed drogue of claim 1, wherein said first and second support arms are fixedly mounted to said trailing edge portion of said refueling coupling member.

6. The passive variable speed drogue of claim 1, further comprising:

a plurality of forward leading edge support arms adapted to be mounted to said trailing edge portion of said refueling coupling means extending radially outwardly and rearward of said first and second support arms, said plurality of forward leading edge support arms each having a leading end and a trailing end; and a forward drogue canopy attached between said trailing end of said leading edge support arms and said first support arms.

7. A passive variable speed drogue for use with an inflight aerial refueling system, said system including a fuel supply; a fuel line having leading and trailing ends and being in fluid communication with said fuel supply; and a refueling coupling member for receiving a refueling probe, said refueling coupling member having a longitudinal axis, a forward end and a rearward end, and a trailing edge portion at said rearward end, said refueling coupling member forward end being mounted to said trailing end of said fuel line; said passive variable speed drogue comprising:

a plurality of first and second support arms adapted to be mounted to a trailing edge portion of a refueling coupling member, said plurality of first and second support arms each having a leading end and a trailing end;

a bleeding drogue canopy having a leading edge, a trailing edge, and a projected area, said bleeding drogue canopy being connected between said trailing ends of the first and second support arms, said bleeding drogue canopy being movable between a retracted position and an extended position, said projected area of said bleeding drogue canopy being variable between a maximum projected area in said retracted position and a minimum projected area in said extended position; and a plurality of springs operatively connecting said bleeding drogue canopy between said first and second support arms biasing said bleeding drogue canopy to said retracted position, whereby over a range of refueling speeds said bleeding drogue extends as the speed increases and the load on the drogue increases, and retracts as the speed decreases and the load on the bleeding drogue decreases, to maintain substantially constant loads on the bleeding drogue within the range of refueling speeds.

8. The passive variable speed drogue of claim 7, wherein said plurality of springs comprises coil springs disposed in said second support arms.

9. The passive variable speed drogue of claim 8, wherein said springs are connected to said aft bleeding drogue canopy by cords.

10. The passive variable speed drogue of claim 9, wherein said cords have an origin end and an opposing end, and said cords are each attached at their origin end to the trailing edge of the aft bleeding drogue canopy, continue respectively through each of the second support arms, along each first support arm, through small rings attached to the inside of the aft bleeding drogue canopy, and are respectively attached at their opposing ends to the trailing edge of the aft bleeding drogue canopy where the origins of the cords are attached.

11. The passive variable speed drogue of claim 7, wherein said first and second support arms are fixedly mounted to said trailing edge portion of said refueling coupling member.

12. The passive variable speed drogue of claim 7, further comprising:
- a plurality of forward leading edge support arms adapted to be mounted to said trailing edge portion of said refueling coupling means extending radially outwardly and rearward of said first and second support arms, said plurality of forward leading edge support arms each having a leading end and a trailing end; and
- a forward drogue canopy attached between said trailing end of said leading edge support arms and said first support arms, said drogue canopy having a leading edge and a trailing edge.

13. A passive variable speed drogue for use with an inflight aerial refueling system, said system including a fuel supply; a fuel line having leading and trailing ends and being in fluid communication with said fuel supply; and refueling coupling means for receiving a refueling probe, said refueling coupling means having a longitudinal axis, a forward end and a rearward end, and a trailing edge portion at said rearward end, said refueling coupling means forward end being mounted to said trailing end of said fuel line; said passive variable speed drogue comprising:
- a plurality of leading edge support arms adapted to be mounted to said trailing edge portion of said refueling coupling means, said plurality of forward leading edge support arms each having a leading end and a trailing end;
- a plurality of center support arms adapted to be mounted to said trailing edge portion of said refueling coupling means, extending radially inwardly and rearward of said leading edge support arms, said plurality of center support arms each having a leading end and a trailing end;
- a forward drogue canopy attached between said trailing end of said leading edge support arms and said trailing end of said center support arms, said drogue canopy having a leading edge and a trailing edge;
- a plurality of trailing edge support arms adapted to be mounted to said trailing edge portion of said refueling coupling means, said plurality of trailing edge support arms each having a leading end and a trailing end;
- an aft bleeding drogue canopy connected between said leading edge support arms and said center support arms, said aft bleeding drogue canopy having a leading edge, a trailing edge, and a projected area extending between said leading edge support arms and said center support arms, said aft bleeding drogue canopy being movable between a retracted position and an extended position, said projected area of said aft bleeding drogue canopy being variable between a maximum projected area in said retracted position and a minimum projected area in said extended position;
- a plurality of springs operatively connecting said aft bleeding drogue canopy between said trailing end of said center support arms and said trailing end of said trailing edge support arms biasing said aft bleeding drogue canopy to said retracted position, whereby over a range of refueling speeds said aft bleeding drogue extends as the speed increases and the load on the aft bleeding drogue increases, and retracts as the speed decreases and the load on the aft bleeding drogue decreases, to maintain substantially constant loads on the aft bleeding drogue within the range of refueling speeds.

14. The passive variable speed drogue of claim 13, wherein said plurality of springs comprises coil springs disposed in said second support arms.

15. The passive variable speed drogue of claim 13, wherein said springs are connected to said aft bleeding drogue canopy by cords.

16. The passive variable speed drogue of claim 15, wherein said plurality of cords have an origin end and an opposing end, and said plurality of cords are each attached at their origin end to the trailing edge of the aft bleeding drogue canopy, continue respectively through each of the trailing edge support arms, along each center support arm, through small rings attached to the inside of the aft bleeding drogue canopy, and are respectively attached at their opposing ends to the trailing edge of the aft bleeding drogue canopy where the origins of the cords are attached.

17. The passive variable speed drogue of claim 13, wherein said leading edge support arms, said center support arms, and said trailing edge support arms are fixedly mounted to said trailing edge portion of said refueling coupling member.

* * * * *